United States Patent
Takeshima et al.

(10) Patent No.: US 9,446,964 B2
(45) Date of Patent: Sep. 20, 2016

(54) PROCESS FOR MANUFACTURING LITHIUM TITANIUM OXIDES

(75) Inventors: Kazuyoshi Takeshima, Yokkaichi (JP); Tsunehisa Takeuchi, Yokkaichi (JP); Masatoshi Honma, Yokkaichi (JP); Yusuke Okuda, Yokkaichi (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 107 days.

(21) Appl. No.: 14/113,855

(22) PCT Filed: Apr. 26, 2012

(86) PCT No.: PCT/JP2012/061213
§ 371 (c)(1),
(2), (4) Date: Oct. 25, 2013

(87) PCT Pub. No.: WO2012/147854
PCT Pub. Date: Nov. 1, 2012

(65) Prior Publication Data
US 2014/0050657 A1    Feb. 20, 2014

(30) Foreign Application Priority Data
Apr. 28, 2011 (JP) ................. 2011-100660

(51) Int. Cl.
*C01G 23/00* (2006.01)
*C01D 15/02* (2006.01)
*H01M 4/485* (2010.01)
*H01M 10/052* (2010.01)
*H01M 4/02* (2006.01)

(52) U.S. Cl.
CPC .......... *C01D 15/02* (2013.01); *C01G 23/005* (2013.01); *H01M 4/485* (2013.01); *C01P 2002/72* (2013.01); *C01P 2004/61* (2013.01); *C01P 2006/12* (2013.01); *C01P 2006/80* (2013.01); *H01M 10/052* (2013.01); *H01M 2004/021* (2013.01); *Y02E 60/122* (2013.01); *Y02P 70/54* (2015.11); *Y02T 10/7011* (2013.01)

(58) Field of Classification Search
USPC ............................................. 423/598, 594.15
See application file for complete search history.

(56) References Cited

U.S. PATENT DOCUMENTS

| | | | | |
|---|---|---|---|---|
| 6,475,673 B1 * | 11/2002 | Yamawaki | ............ | C04B 35/462 423/598 |
| 2008/0047483 A1 * | 2/2008 | Venkataramani et al. | ........ | 117/8 |
| 2009/0107334 A1 * | 4/2009 | Oh-ishi et al. | ................. | 95/139 |

FOREIGN PATENT DOCUMENTS

| | | |
|---|---|---|
| CN | 101262941 | 9/2008 |
| CN | 101659443 | 3/2010 |
| EP | 22328212 A1 | 6/2011 |
| JP | 06-275263 | 9/1994 |
| JP | 10-139430 | 5/1998 |
| JP | 2000-302547 | 10/2000 |
| JP | 2001-192208 | 7/2001 |
| JP | 2001-213622 | 8/2001 |
| JP | 2012 13623 A | 8/2001 |
| JP | 2010-254482 | 11/2010 |
| JP | 2011-113796 | 6/2011 |
| WO | WO 2007-032494 | 3/2007 |

OTHER PUBLICATIONS

Kuang Che Hsiao et al., Electrochimica Acta, vol. 53, pp. 7242-7247, May 8, 2008.

* cited by examiner

*Primary Examiner* — Matthew E Hoban
*Assistant Examiner* — James Fiorito
(74) *Attorney, Agent, or Firm* — Paul E. White, Jr.; Manelli Selter PLLC

(57) ABSTRACT

Provided is a process for manufacturing, at a low cost and efficiently, lithium titanium oxides which are useful for electricity storage devices. A desired lithium titanium oxide can be obtained by heating at least both (1) a titanium compound and (2) a lithium compound that has a volume-mean particle diameter of 5 μm or less. The lithium compound is preferably obtained by adjusting the volume-mean particle diameter to 5 μm or less by pulverizing. It is preferable that the titanium compound and the lithium compound are heated together with (3) a lithium titanium oxide compound that has the same crystal structure as that of objective lithium titanium oxide. It is preferable that these materials are dry-blended prior to the heating.

9 Claims, 2 Drawing Sheets

PROCESS FOR MANUFACTURING LITHIUM TITANIUM OXIDES

This application is the national phase of international application PCT/JP2012/061213 filed 26 Apr. 2012 which designated the U.S.

TECHNICAL FIELD

The present invention relates to a method for producing lithium titanate. More particularly, the invention relates to a low-cost, efficient method for producing lithium titanate. The invention also relates to lithium titanate produced by the method, and an electrode active material and an electric storage device which include the same.

BACKGROUND ART

Lithium titanate, which has been developed as a material for an electric storage device, is used as an electrode active material excellent in safety and life property for an electric storage device, in particular, a negative electrode active material for a lithium secondary battery. The use of a lithium secondary battery as a small battery for power supply to a portable device or the like has rapidly spread. Furthermore, a large lithium secondary battery has been developed for use in power generation industries or on vehicles etc. The electrode active material for a large lithium secondary battery requires long term reliability and high input/output characteristics, and the use of lithium titanate as a negative electrode active material, in particular, is promising, due to excellence in safety and life property.

Examples of the lithium titanate include several compounds as described in Patent Literature 1. Patent literature 1 describes compounds represented by a general formula $Li_xTi_yO_4$, where $0.8 \leq x \leq 1.4$ and $1.6 \leq y \leq 2.2$, including typical examples $LiTi_2O_4$, $Li_{1.33}Ti_{1.66}O_4$, and $Li_{0.8}Ti_{2.2}O_4$. Examples of the known method for producing the lithium titanate include: a wet method (Patent Literature 2) by mixing predetermined amounts of a lithium compound and a titanium compound in solvent, drying the mixture, and firing the dried mixture; a spray drying method (Patent Literature 3) by spray-drying the mixture for drying in the wet method; a dry method (Patent Literatures 1 and 4) by dry-mixing predetermined amounts of a lithium compound and a titanium compound and firing the mixture.

CITATION LIST

Patent Literature

Patent Literature 1: JP 06-275263 A
Patent Literature 2: JP 2001-213622 A
Patent Literature 3: JP 2001-192208 A
Patent Literature 4: JP 2000-302547 A

SUMMARY OF INVENTION

Technical Problem

In both of the dry method and the wet method, a lithium compound and a titanium compound are fired to produce lithium titanate. The low reactivity due to a solid phase diffusion reaction between the respective raw materials easily allows a by-product having a different composition or the unreacted raw materials other than a target lithium titanate to remain. This prevents a battery using lithium titanate from having a sufficient electric power capacity. Meanwhile, although higher firing temperature improves the reactivity, the volatilization loss of lithium occurs easily and the contraction, sintering, and grain growth of lithium titanate particles are accelerated, resulting in reduction of the specific surface area of lithium titanate particles. This easily causes the reduction in rate characteristics of a battery using lithium titanate.

Solution to Problem

The present inventors performed earnest research on the method for efficiently producing a target lithium titanate, through the improvement of reactivity between a lithium compound and a titanium compound and found that the problem can be solved by heating at least a titanium compound and a lithium compound to be described later having a volume average particle diameter of 5 µm or less, thus having completed the present invention.

Advantageous Effects of Invention

A method for producing lithium titanate of the present invention uses a lithium compound having a volume average particle diameter of 5 µm or less to improve the reactivity of a titanium compound and the lithium compound. As a result, a target lithium titanate can be efficiently produced. According to the method of the present invention, a sub-phase having a different composition is less formed, less unreacted raw materials remain, sintering proceeds less rapidly, and the specific surface area is less reduced. A target lithium titanate can be reliably and stably produced at a heating temperature lower than that in a conventional production method.

The use of the lithium titanate produced by the method as an electrode active material allows for production of an electric storage device excellent in battery characteristics, in particular, rate characteristics.

DESCRIPTION OF EMBODIMENTS

Figure 1:
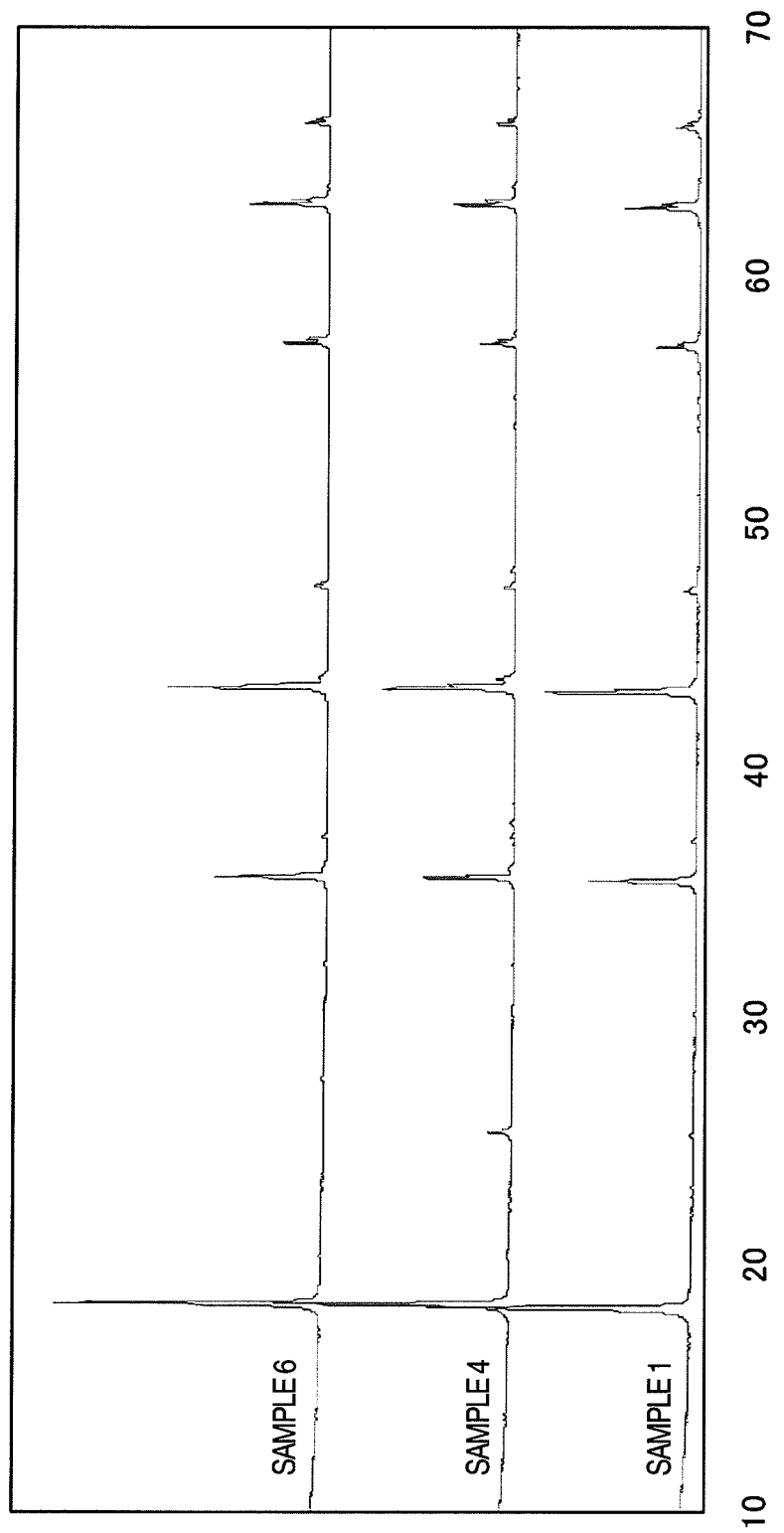
FIG. 1 is a chart illustrating powder X-ray diffraction patterns of Samples 1, 4, and 6.

Measurement methods used in the present specification are described below.

Specific Surface Area

In the present specification, the specific surface area was measured by single-point BET nitrogen adsorption. Monosorb made by Yuasa-Ionics Co., Ltd. or Monosorb MS-22 made by Quantachrome Instruments was used as a measurement device.

Particle Diameter (Lithium Compound)

In the present specification, the average particle diameter of a lithium compound is the volume average particle diameter measured by a laser diffraction method. The volume average particle diameter was measured with a laser diffraction/scattering particle size distribution measurement device, using ethanol as dispersion medium. In the measurement, the refractive index of ethanol was set as 1.360, and the refractive index of a lithium compound was appropriately set corresponding to the species of the compound. For example, when the lithium compound was lithium carbonate, the refractive index was set to 1.500. As the laser diffraction/scattering particle size distribution measurement device, LA-950 made by Horiba, Ltd. was used.

Particle Diameter (Titanium Compound)

In the present specification, the average particle diameter of primary particles of a titanium compound is the average value of particle diameters of 100 primary particles in an image picture of a transmission electron microscope (an electron microscope method).

In the present specification, the average secondary particle diameter of secondary particles of a titanium compound is the volume average particle diameter measured by a laser diffraction method. The volume average particle diameter was measured with a laser diffraction/scattering particle size distribution measurement device, using pure water as dispersion medium. In the measurement, the refractive index of pure water was set as 1.333, and the refractive index of a titanium compound was appropriately set corresponding to the species of the compound. For example, when the titanium compound was anatase-type titanium oxide, the refractive index was set to 2.520. As the laser diffraction/scattering particle size distribution measurement device, LA-950 made by Horiba, Ltd. was used.

Particle Diameter (Precursor Mixture)

In the present specification, the average particle diameter of a lithium titanate precursor mixture is a volume average particle diameter measured by a laser diffraction method. The volume average particle diameter was measured with a laser diffraction/scattering particle size distribution measurement device, using ethanol as dispersion medium. In the measurement, the refractive index of ethanol was set as 1.360, and the refractive index of the measured particles was set to a value of the species of the lithium compound. For example, when the lithium compound was lithium carbonate, the refractive index was set to 1.567. As the laser diffraction/scattering particle size distribution measurement device, LA-950 made by Horiba, Ltd. was used.

Particle Diameter (Lithium Titanate)

In the present specification, the average particle diameter of primary particles of lithium titanate is the average value of particle diameters of 100 primary particles in an image picture of a transmission electron microscope (an electron microscope method).

In the present specification, the average secondary particle diameter of secondary particles of lithium titanate is the volume average particle diameter measured by a laser diffraction method. The volume average particle diameter was measured with a laser diffraction/scattering particle size distribution measurement device, using pure water as dispersion medium. In the measurement, the refractive index of water was set as 1.333, and the refractive index of lithium titanate was appropriately set corresponding to the species of the compound. When the lithium titanate was $Li_4Ti_5O_{12}$, the refractive index was set to 2.700. As the laser diffraction/scattering particle size distribution measurement device, LA-950 made by Horiba, Ltd. was used in the present invention.

Bulk Density

In the present specification, the bulk density was obtained by a cylinder method (calculated from the volume and mass of a sample placed in a graduated cylinder).

Impurities

In the present specification, sodium and potassium as impurities were measured by an atomic absorption spectroscopy, $SO_4$ and chlorine were measured by an ion chromatography method or with a fluorescent X-ray analyzer, and other elements such as silicon, calcium, iron, chromium, nickel, manganese, copper, zinc, aluminum, magnesium, niobium, and zirconium were measured by ICP method. $SO_4$ was measured with a fluorescent X-ray analyzer (RIGAKU RIX-2200).

The present invention is described in the following.

The present invention relates to a method for producing lithium titanate, which includes heating at least the following two compounds: (1) a titanium compound; and (2) a lithium compound having a volume average particle diameter of 5 μm or less.

(1) Titanium Compound

The titanium compound for use may include an inorganic titanium compound and an organic titanium compound such as a titanium alkoxide. Examples of the inorganic titanium compound include a titanic acid compound such as metatitanic acid represented by $TiO(OH)_2$ or $TiO_2.H_2O$ and orthotitanic acid represented by $Ti(OH)_4$ or $TiO_2.2H_2O$, titanium oxide (crystalline titanium oxide such as rutile-type, anatase-type, brookite-type, and bronze-type titanium oxide, or amorphous titanium oxide), and a mixture thereof. The titanium oxide may be a type of titanium oxide having diffraction peaks from a single crystal structure in the X-ray diffraction pattern or a type of titanium oxide having diffraction peaks from a plurality of crystal structures such as the diffraction peaks from anatase and the diffraction peaks from rutile. In particular, crystalline titanium oxides are preferable.

The titanium compound is preferably composed of fine particles, resulting in high reactivity with a lithium compound. The average primary particle diameter (an electron microscope method) is preferably in the range of 0.001 μm to 0.3 μm, more preferably 0.005 to 0.3 μm, further preferably 0.01 to 0.3 μm, and furthermore preferably 0.04 to 0.28 μm. The titanium compound preferably has a large specific surface area, resulting in high reactivity with a lithium compound. The specific surface area is preferably 20 to 300 $m^2/g$, more preferably 50 to 300 $m^2/g$, further preferably 60 to 300 $m^2/g$, and furthermore preferably 60 to 100 $m^2/g$. In the case of using secondary particles granulated of the titanium compound, the average secondary particle diameter (a laser diffraction method) is preferably 0.05 to 5 μm, more preferably 0.1 to 3.0 μm, and further preferably 0.5 to 2.0 μm.

The titanium compound preferably has a high purity, usually 90% or more by weight, more preferably 99% or more by weight. The content of Cl or $SO_4$ as impurity is preferably 0.5% or less by weight. The content of each of other elements is preferably in the following specific range: silicon (1000 ppm or less), calcium (1000 ppm or less), iron (1000 ppm or less), niobium (0.3% or less by weight), and zirconium (0.2% or less by weight).

(2) Lithium Compound

It is important that the lithium compound for use in the present invention has a volume average particle diameter of 5 μm or less, with an appropriate lower limit, so as to improve the reactivity with a titanium compound. The volume average particle diameter is preferably in the range of 0.5 to 5 μm, more preferably in the range of 1 to 5 μm. Alternatively the volume average particle diameter may be 4 μm or less, preferably in the range of 0.5 to 4 μm, more preferably in the range of 1 to 4 μm. The use of lithium compound having a volume average particle diameter of 5 μm or less in production of lithium titanate allows a target lithium titanate to have a high single-phase rate due to the improved reactivity with a titanium compound. On the other hand, the use of lithium compound having a volume average particle diameter of more than 5 μm allows a target lithium titanate to have a low single-phase rate due to poor reactivity with a titanium compound.

The single-phase rate of lithium titanate is represented by the following expression 1, which is an index of the content rate of a target lithium titanate, preferably 95% or more, more preferably 96% or more, more preferably 97% or more:

Single-phase rate (%)=100×(1−Σ($Y_i$/X))   (Expression 1)

where X represents the main peak intensity of a target lithium titanate in a powder X-ray diffraction measurement using the Cu-Kα ray, $Y_i$ represents the main peak intensity of each sub-phase. In the case of $Li_4Ti_5O_{12}$, X is the peak intensity in the vicinity of 2θ=18°, while the peak intensity in the vicinity of 2θ=25° (anatase-type $TiO_2$), the peak intensity in the vicinity of 2θ=27° (rutile-type $TiO_2$), and the peak intensity in the vicinity of 2θ=44° ($Li_2TiO_3$) are used as $Y_i$, since anatase-type $TiO_2$, rutile-type $TiO_2$, and $Li_2TiO_3$ are likely to be present as sub-phases.

The lithium compound having a volume average particle diameter of 5 μm or less may be produced under appropriate production conditions. Alternatively a lithium compound having a volume average particle diameter of more than 5 μm may be produced or purchased so as to be grain-refined to 5 μm or less. A known method may be used in grain refining. In particular, the volume average particle diameter of the lithium compound may be reduced by crushing to preferably 5 μm or less, more preferably 4 μm or less.

A lithium compound particle has a polyhedron shape in general. Crushing allows the particle diameter to be reduced and the angles of the polyhedron shape to be rounded. It is speculated that this enhances flowability of powder, resulting in high miscibility with a titanium compound so as to further improve the reactivity of a lithium titanate precursor.

A known crusher can be used in crushing a lithium compound. A dry crusher such as a flake crusher, a hammer mill, a pin mill, a bantam mill, a jet mill, a Fret mill, a pan mill, an edge runner, a roller mill, a Mix-Muller, and a vibration mill is preferable. Preferably crushing is performed such that the amount of coarse particles is reduced. Specifically, in the particle size distribution measured by the method, a D 90 (diameter at a cumulative frequency of 90%) of 10 μm or less, preferably 9 μm or less, and further preferably 7 μm or less, is suitable for easily producing the effect of the present invention.

A hydroxide, a salt, an oxide of lithium, and the like may be used as the lithium compound, without a specific limitation. Examples may include lithium hydroxide, lithium carbonate, lithium nitrate, lithium sulfate, and lithium oxide. These may be singly used or in combination of two or more. Among the lithium compounds, lithium hydroxide, lithium carbonate, or lithium oxide is preferably used, in order to prevent an acid radical from remaining in lithium titanate. In particular, lithium hydroxide or lithium carbonate is more preferably used, and lithium carbonate is further preferably used, due to easiness in crushing.

In the present invention, the acid radical means a sulfate radical ($SO_4$) and a chlorine radical (Cl).

The lithium compound preferably has a high purity, usually 98.0% or more by weight. In the case of using lithium carbonate as the lithium compound, the content of $Li_2CO_3$ is preferably 98.0% or more by weight, more preferably 99.0% or more by weight, the content of impurity metal elements such as Na, Ca, K, and Mg is 1000 ppm or less, and the content of Cl and $SO_4$ is 1000 ppm or less, preferably 500 ppm or less. Preferably water is sufficiently removed. The content of water is preferably 0.3% or less by weight. The lithium compound preferably has a higher specific surface area for reactivity. In the case of lithium carbonate, for example, the specific surface area is preferably 0.8 m²/g or more, more preferably in the range of 1.0 to 3.0 m²/g.

(3) Lithium Titanate Compound Having the Same Crystal Structure as that of a Target Lithium Titanate The lithium titanate compound is used if needed. It is believed that the lithium titanate compound suppresses the sintering of the produced lithium titanate, or acts as a seed crystal. The use of the lithium titanium compound allows the heating process to be hereinafter described to be performed at a relatively low temperature and the grain growth of lithium titanate in the heating process to be properly controlled, so that the target lithium titanate can be easily produced. Having the same crystal structure as that of the target lithium titanate is thus required. The particle diameter (an electron microscope method) of the lithium titanate compound is not specifically limited. The lithium titanate may have a particle diameter comparable to the particle diameter (an electron microscope method) of a target lithium titanate, for example, in the range of 0.5 to 2.0 μm. The lithium titanate compound can be manufactured by the method of the present invention. The compounding amount is preferably 1 to 30 weight parts calculated in terms of Ti, more preferably 5 to 20 weight parts, relative to 100 weight parts of a titanium compound being a raw material. A mixing aid or the like may be used in addition to the (1), the (2), and the (3).

In the present invention, at least the (1) titanium compound and the (2) lithium compound having a volume average particle diameter of 5 μm or less are heated together with the (3) lithium titanate compound having the same crystal structure as that of the target lithium titanate and the like on an as required basis as described above so as to produce lithium titanate.

The ratio of the volume average particle diameter (B μm) of the lithium compound to the volume average particle diameter (A μm) of secondary particles of the titanium compound (B/A) is preferably 0.1 to 80, more preferably 0.1 to 20, further preferably 0.1 to 8. The B/A in the range allows the particle diameters of the lithium compound and the titanium compound to be relatively uniformed, easily producing a lithium titanate precursor mixture having a narrow particle size distribution. This allows a lithium titanate precursor mixture having higher reactivity between a lithium compound and a titanium compound to be easily produced. The B/A is more preferably in the range of 1.0 to 5.0, further preferably 1.0 to 4.0.

Preferably, prior to the heating, the aforementioned raw materials are mixed to prepare a mixture (hereinafter may be referred to as "precursor mixture") in advance. Preferably, the mixing includes dry-mixing at least the (1) titanium compound and the (2) lithium compound having a volume average particle diameter of 5 μm or less. In the case of using the (3) lithium titanate compound having the same crystal structure as that of a target lithium titanate for production, preferably the lithium titanate compound is dry-mixed with the above two.

A known mixing machine may be used for preparing the precursor mixture. For example, a dry-mixing machine such as a Henschel mixer, a V-shape mixer, a powder mixer, a double cone blender, and a tumbler mixer is preferably used. Mixing atmosphere is not specifically limited.

In preparation of the precursor mixture, crushing of a lithium compound and crushing of a titanium compound may be concurrently performed to prepare the precursor mixture (the method may be hereinafter referred to as "mixed crushing"). In that case, a known crushing machine may be used. A dry-crushing machine such as a flake crusher, a hammer mill, a pin mill, a bantam mill, a jet mill, a cyclone mill, a Fret mill, a pan mill, an edge runner, a roller mill, a Mix-Muller, and a vibration mill is preferable, and an air flow crusher such as a jet mill and a cyclone mill is further preferable.

In mixed crushing, both of a titanium compound and a lithium compound may be fed into a crushing machine. After initiation of crushing the one, the other may be then fed; or crushing may be initiated after feeding both. Alternatively, both may be mixed in a known mixer such as a Henschel mixer in advance, and then the mixture may be fed into a crushing machine so as to be crushed. The crushing under coexistence of the titanium compound and the lithium compound allows the lithium titanate precursor mixture of the titanium compound and the lithium compound which are sufficiently mixed to be obtained. Each of the titanium compound and the lithium compound may have an intended size after crushing.

The crushing under coexistence of at least the lithium compound and the titanium compound more easily increases the degree of mixture of the titanium compound and the lithium compound compared with the mere mixing of fine particles in general, and preferably provides the lithium titanate precursor mixture of the lithium compound and the titanium compound having a narrow particle size distribution with a uniform particle diameter more easily. The preferable lithium titanate precursor mixture having higher reactivity between the lithium compound and the titanium compound is thus more easily obtained.

In the case of using an air flow crusher for mixed crushing, a titanium compound having a low bulk density, more specifically a bulk density in the range of 0.2 to 0.7 g/cm$^3$, produces a preferable lithium titanate precursor mixture having high reactivity. It is believed that the titanium compound having a relatively low bulk density is easily dispersed in the air flow in the crusher so as to be uniformly mixed with a lithium compound. The range of the bulk density is more preferably 0.2 to 0.6 g/cm$^3$, further preferably 0.2 to 0.5 g/cm$^3$.

Concurrently with mixed crushing and/or after mixed crushing, the mixture is preferably placed under pressure. Since a crushed mixture has a bulky volume (low bulk density) and a large occupied volume per unit mass in general, productivity such as the amount of throughput (material input amount) per unit time or per facility is reduced. Preferably, therefore, the crushed mixture is placed under pressure so as to avoid getting bulky and to have a proper bulk density. The application of pressure further allows the titanium compound and the lithium compound to easily come into contact with each other, so that a preferable lithium titanate precursor mixture having high reactivity between the lithium compound and the titanium compound can be more easily produced. Means for pressure (compression) forming and means for crushing under pressure (compression) can be used as the means for applying pressure.

A known pressure forming machine and a known compacting machine including a roller compactor, a roller crusher, and a pellet forming machine can be used as means for pressure (compression) forming of the mixed crushed powder after mixed crushing.

A pressure crushing machine and a compression crushing machine may be used as means for applying pressure concurrently with crushing. A crushing machine using pressure or compression may be appropriately used. At least one crushing machine selected from the group consisting of a Fret mill, a pan mill, an edge runner, a roller mill, and a Mix Muller may be used. The principle of crushing in a crushing machine is that high pressure applied to a specimen crushes the specimen.

In the case of a Fret mill, the operating mechanism is described as follows. The rotation of a heavy roller grinds a specimen under the roller. A plurality of compounds is ground under the roller for a predetermined time period so as to be concurrently mixed. The use of a crushing machine of the type allows the mixed powder to be placed under pressure concurrently with crushing, so that the process can be simplified without necessity of separately having a compression process.

The lithium titanate precursor mixture preferably has a bulk density of preferably 0.2 to 0.7 g/cm$^3$, more preferably 0.4 to 0.6 g/cm$^3$. A bulk density lower than the range reduces the contact between the titanium compound and the lithium compound, resulting in reduced reactivity. A bulk density higher than the range allows gas generated in the reaction during the heating process to hardly escape or inhibits thermal conductivity, also resulting in reduced reactivity. Consequently, the single-phase rate of the produced lithium titanate is reduced in both cases. The lithium titanate precursor having a bulk density in the range described above can be easily obtained under an applied pressure to powder of 0.6 t/cm$^2$ or less, more preferably less than 0.5 t/cm$^2$, further preferably in the range of 0.15 to 0.45 t/cm$^2$.

The frequency curve of the particle size distribution of the lithium titanate precursor mixture measured in a dispersed state in ethanol preferably has only one peak. Preferably the volume average particle diameter is 0.5 µm or less and the D 90 (diameter at a cumulative frequency of 90%) is 10 µm or less, more preferably the volume average particle diameter is 0.45 µm or less and the D 90 (diameter at a cumulative frequency of 90%) is 6 µm or less.

The particle size distribution is controlled in the range described above, so that a sub-phase having a different composition is less formed, less unreacted raw materials remain, sintering proceeds less rapidly, and the specific surface area is less reduced. A target lithium titanate can be reliably and stably produced at a heating temperature lower than that in a conventional method.

The compounding ratio of the lithium compound to the titanium compound may be set in accordance with the composition of the target lithium titanate. In the case of producing $Li_4Ti_5O_{12}$ as lithium titanate, compounding is performed to have a Li/Ti ratio of 0.79 to 0.85. The crushing is not necessarily required for all the lithium compound and/or the titanium compound. A portion of the compounds may be crushed and the remaining portion may be added thereto to produce a lithium titanate precursor mixture.

In heating and reacting at least the aforementioned (1) titanium compound, the (2) lithium compound having a volume average particle diameter of 5 µm or less, and the (3) lithium titanate compound having the same crystal structure as that of a target lithium titanate if needed, the raw materials are placed in a heating furnace, so as to be raised to a predetermined temperature and held at the temperature for a predetermined time period for reaction. Examples of the heating furnace for use include a fluidized furnace, a stationary furnace, a rotary kiln, a tunnel kiln. The heating temperature is preferably 700° C. or higher and 950° C. or lower. In the case of $Li_4Ti_5O_{12}$, a temperature lower than 700° C. allows the single-phase rate of a target lithium titanate to be reduced, resulting in an increased amount of undesirable unreacted titanium compounds. On the other hand, a temperature higher than 950° C. allows undesirable impurity phases ($Li_2TiO_3$ and $Li_2Ti_3O_7$) to be created. The preferable heating temperature in the range of 700° C. to 800° C. allows for the single-phase rate, which is described below, of 95% or more, in particular 97% or more, and stably produces the lithium titanate with suppressed sintering or grain growth. The heating time may be appropriately determined, in the suitable range of 3 to 6 hours. The heating atmosphere is not specifically limited. An oxidizing atmosphere such as air and oxygen gas, a non-oxidizing atmosphere such as nitrogen gas and argon gas, or a reducing atmosphere such as hydrogen gas and carbon monoxide gas can be used. In particular, an oxidizing atmosphere is preferable.

The lithium titanate thus produced may be disintegrated or crushed after cooling, if needed. The known crushing machine may be used for crushing. Sintering and grain growth are suppressed in the lithium titanate of the present invention, so that the lithium titanate particles are easily loosened by disintegration or crushing. Consequently, the lithium titanate particles are easily dispersed in a paste, suitable for manufacturing an electrode of an electric storage device.

The produced lithium titanate has a large specific surface area of, preferably 1.0 $m^2/g$ or more, more preferably 2.0 to 50.0 $m^2/g$, further preferably 2.0 to 40.0 $m^2/g$. The bulk density and the volume average particle diameter of lithium titanate may be appropriately set. The bulk density is preferably 0.1 to 0.8 $g/cm^3$, more preferably 0.2 to 0.7 $g/cm^3$. The volume average particle diameter is preferably 1 to 10 µm. The content of impurities is preferably low, more specifically in the following specific range: sodium (1000 ppm or less), potassium (500 ppm or less), silicon (1000 ppm or less), calcium (1000 ppm or less), iron (500 ppm or less), chromium (500 ppm or less), nickel (500 ppm or less), manganese (500 ppm or less), copper (500 ppm or less), zinc (500 ppm or less), aluminum (500 ppm or less), niobium (0.3% or less by weight), zirconium (0.2% or less by weight), $SO_4$ (1.0% or less by weight), and chlorine (1.0% or less by weight).

The present invention also relates to an electrode active material which includes the lithium titanate of the present invention. The present invention also relates to an electric storage device including the use of lithium titanate produced by the production method of the present invention. The electric storage device includes an electrode, a counter electrode, a separator, and an electrolyte. The electrode is produced by adding a conductive material and a binder to the electrode active material so as to be appropriately formed or coated. Examples of the conductive material include a conductive aid such as carbon black, acetylene black, and ketjen black. Examples of the binder include a fluorine resin such as polytetrafluoroethylene, polyvinylidene fluoride, and fluororubber, and a water-soluble resin such as styrene-butadiene rubber, carboxymethylcellulose, and polyacrylic acid. In the case of a lithium battery, the electrode active material is used for the positive electrode and metal lithium, lithium alloy, or a carbon-containing material such as graphite may be used for the counter electrode. Alternatively, the electrode active material may be used for the negative electrode, and a lithium-transition metal composite oxide such as a lithium-manganese composite oxide, a lithium-cobalt composite oxide, a lithium-nickel composite oxide, a lithium-cobalt-manganese-nickel composite oxide, and a lithium-vanadium composite oxide, and an olivine-type compound such as a lithium-iron phosphate composite compound may be used for the positive electrode. A porous polypropylene film or the like is used for any devices. A commonly used material such as a lithium salt such as $LiPF_6$, $LiCF_4$, $LiCF_3SO_3$, $LiN(CF_3SO_2)_2$, and $LiBF_4$ dissolved in a solvent such as propylene carbonate, ethylene carbonate, dimethyl carbonate, diethyl carbonate, ethylmethyl carbonate, γ-butyl lactone, and 1,2-dimethoxy ethane may be used as the electrolyte. The lithium titanate of the present invention may be used not only as an active material of a lithium secondary battery but also for attaching to the surface of an active material of another type, for compounding in an electrode, for being contained in a separator, or as a lithium ion conductor. Alternatively, the lithium titanate may be used as an active material of a sodium ion battery.

EXAMPLES

Examples of the present invention are described in the following. The present invention is, however, not limited to the examples.

Crushing of Lithium Carbonate

Sample a of lithium carbonate powder (purity: 99.2%) was used as a lithium compound. Sample a was crushed into Sample b having a volume average particle diameter of 4 µm or less, using a jet mill (STJ-200 made by Seishin Enterprise Co., Ltd). Sample c was obtained with enhanced crushing with a reduced feed rate compared to the rate in production of Sample b. Samples d and e having different particle diameters respectively were obtained with moderate crushing with an increased feed rate compared to the rate in production of Sample b.

(Evaluation 1)

The particle size distribution of the raw material samples a to e was measured with a laser diffraction/scattering particle size distribution measurement device (LA-950 made by Horiba, Ltd). In the measurement, using ethanol as a dispersion medium, the refractive indexes of lithium carbonate and ethanol were set as 1.500 and 1.360, respectively. The results are described in Table 1. The volume average particle diameter of each of Samples a to e was 8.1 µm, 3.7 µm, 2.1 µm, 5.0 µm or 7.7 µm. The D 90 (diameter at a cumulative frequency of 90%) of each was 13.0 µm, 6.2 µm, 3.1 µm, 8.1 µm or 12.0 µm.

TABLE 1

|  | Volume average particle diameter | D5 | D10 | D20 | D50 | D80 | D90 | D95 |
| --- | --- | --- | --- | --- | --- | --- | --- | --- |
| Sample a | 8.1 | 3.5 | 4.1 | 5.1 | 7.4 | 10.8 | 13.0 | 15.1 |
| Sample b | 3.7 | 1.4 | 1.8 | 2.3 | 3.3 | 4.9 | 6.2 | 7.5 |
| Sample c | 2.1 | 1.1 | 1.3 | 1.5 | 2.0 | 2.7 | 3.1 | 3.6 |
| Sample d | 5.0 | 2.1 | 2.4 | 3.0 | 4.5 | 6.6 | 8.1 | 9.6 |
| Sample e | 7.7 | 3.5 | 4.1 | 5.1 | 7.2 | 10.1 | 12.0 | 13.8 |

(All figures in µm)

Synthesis of Lithium Titanate, $Li_4Ti_5O_{12}$

Example 1

Titanium oxide powder (made by Ishihara Sangyo Kaisha, Ltd., purity: 97.3%, volume average particle diameter: 1.3 µm, specific surface area: 93 $m^2/g$) as a titanium compound and Sample b as a lithium compound were sampled to obtain a Li/Ti molar ratio of 0.81. The raw materials were mixed in a Henschel mixer for 10 minutes at 1800 rpm so that a precursor mixture was prepared. Subsequently the precursor mixture was heated at 750° C. in the atmosphere for 3 hours, using an electric furnace, so that lithium titanate was synthesized. The produced lithium titanate was disintegrated with a jet mill, so that Sample 1 was obtained.

Example 2

Sample 2 was obtained in the same manner as in Example 1 except for the use of Sample c as the lithium compound.

Example 3

Sample 3 was obtained in the same manner as in Example 1 except for the use of Sample d as the lithium compound.

Comparative Example 1

Sample 4 was obtained in the same manner as in Example 1 except for the use of Sample a as the lithium compound.

Comparative Example 2

Sample 5 was obtained in the same manner as in Example 1 except for the use of Sample e as the lithium compound.

Comparative Example 3

Sample 6 was obtained in the same manner as in Comparative Example 1, except that the heating was performed at 800° C. in the atmosphere for 3 hours.

(Evaluation 2)

The powder X-ray diffraction pattern of each of the obtained Samples 1 to 6 was observed with a powder X-ray diffractometer (Ultima IV made by Rigaku Corporation, with Cu-Kα ray). The results of the powder X-ray diffraction measurement of Samples 1, 4, and 6 are illustrated in FIG. 1. Among the measured peak intensities, the peak intensity of $Li_4Ti_5O_{12}$ in the vicinity of $2θ=18°$ was used as X, and the peak intensity of rutile-type $TiO_2$ in the vicinity of $2θ=27°$, the peak intensity of anatase-type $TiO_2$ in the vicinity of $2θ=25°$, and the peak intensity of $Li_2TiO_3$ in the vicinity of $2θ=44°$ were used as Y, so as to calculate the single-phase rate. The results are described in Table 2. Samples 1 to 3 with the use of crushed lithium carbonate having a volume average particle diameter of 5 μm or less produced lithium titanate $Li_4Ti_5O_{12}$ having a single-phase rate of 95% or more even at a heating temperature of 750° C. In contrast, the use of lithium carbonate having a volume average particle diameter of more than 5 μm did not produce lithium titanate $Li_4Ti_5O_{12}$ having a single-phase rate of 95% or more at a heating temperature of 750° C. (Samples 4 and 5). Lithium titanate $Li_4Ti_5O_{12}$ having a single-phase rate of 95% or more was eventually produced at a heating temperature of 800° C. (Sample 6). This proves that the production method of the present invention allows for the synthesis of lithium titanate having a single-phase rate of 95% or more even at a lower heating temperature for synthesizing lithium titanate, specifically lower than 800° C.

TABLE 2

| | Lithium compound | Firing temperature | Lithium titanate | Single-phase rate |
|---|---|---|---|---|
| Example 1 | Sample b | 750° C. | Sample 1 | 98% |
| Example 2 | Sample c | 750° C. | Sample 2 | 98% |
| Example 3 | Sample d | 750° C. | Sample 3 | 98% |
| Comparative example 1 | Sample a | 750° C. | Sample 4 | 93% |
| Comparative example 2 | Sample e | 750° C. | Sample 5 | 92% |
| Comparative example 3 | Sample a | 800° C. | Sample 6 | 99% |

(Evaluation 3)

The specific surface area of each of Sample 1 and Sample 6 having a single-phase rate of 95% or more was measured by single-point BET method (nitrogen adsorption, Monosorb made by Yuasa-Ionics Co., Ltd). As a result, the samples had a specific surface area of 4.9 $m^2/g$ and 3.0 $m^2/g$, respectively. This showed that even in the case of synthesizing lithium titanate having a single-phase-rate of 95%, the production method of the present invention prevents lithium titanate particles from sintering with each other and allows for synthesis of lithium titanate which is easily crushed to achieve suppressed reduction in specific surface area.

(Evaluation 4)

Evaluation of Battery Characteristics (1) Manufacturing of Electric Storage Device Lithium titanate of Sample 1, acetylene black powder as a conductive material, and a polyvinylidene fluoride resin as a binder were mixed at a weight ratio of 100:5:7, and kneaded into a paste in a mortar. The paste was applied to an aluminum foil, dried at a temperature of 120° C. for 10 minutes, and then punched out into a circular form with a diameter of 12 mm, which was pressed at 17 MPa to form a working electrode. The weight of the active material contained in the electrode was 3 mg.

The working electrode was vacuum-dried at 120° C. for 4 hours, and then installed as a positive electrode into a closable coin-type battery in a glove box with a dew point of −70° C. or lower. The coin-type battery was formed of stainless steel (SUS 316) with an outer diameter of 20 mm and a height of 3.2 mm. The negative electrode was formed of metal lithium in a circular shape with a thickness of 0.5 mm and a diameter of 12 mm. $LiPF_6$ was dissolved in a mixed solution of ethylene carbonate and dimethyl carbonate (at mixing volume ratio of 1:2) at a concentration of 1 mole/litter so as to form a nonaqueous electrolyte.

The working electrode was placed on the lower can of the coin-type battery. A porous polypropylene film was placed thereon as a separator, and the nonaqueous electrolyte was dropped thereon. The negative electrode and a spacer with a thickness of 0.5 mm and a spring (both made of SUS 316) for thickness adjustment were placed further thereon. An upper can having a gasket made of polypropylene was placed as a cover, of which outer periphery was clinched for sealing. An electric storage device (Sample A) of the present invention was thus obtained.

An electric storage device (Sample B) in the comparative example was obtained in the same method as for Sample A of an electric storage device except for the use of Sample 6 as the lithium titanate.

(2) Evaluation of Rate Characteristics

Figure 2:
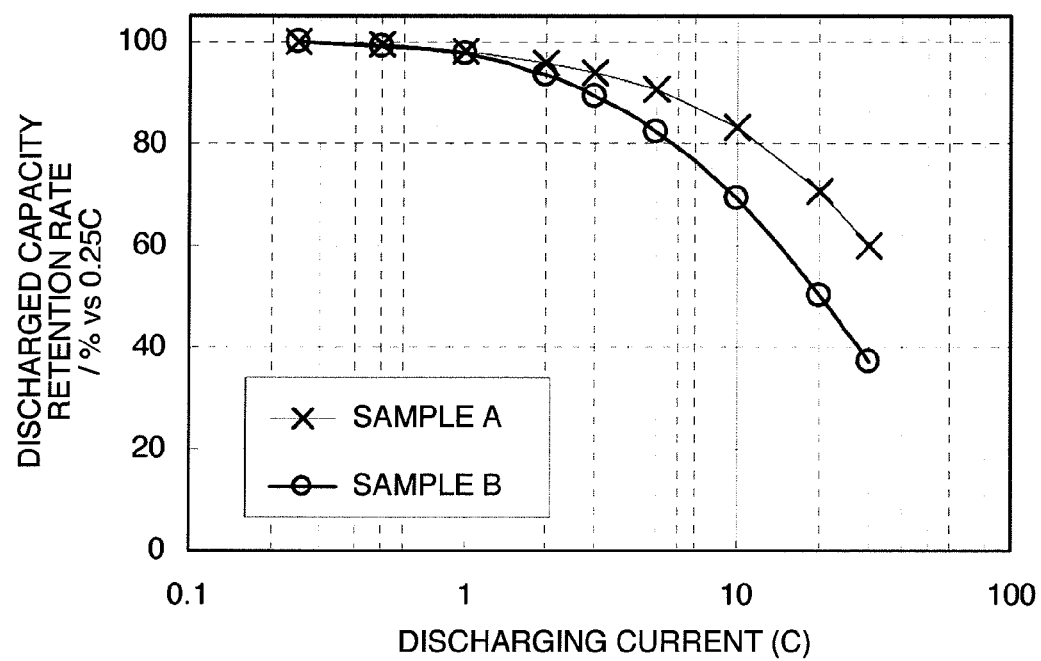
FIG. 2 is a graph illustrating the rate characteristics of the electric storage devices of Sample A and Sample B.

The discharged capacity of the produced electric storage devices (Samples A and B) was measured for various current amounts so as to calculate a capacity retention rate (%). The voltage range was set to 1 to 3 V, the charging current was set to 0.25 C, the discharging current was set to the range of 0.25 C to 30 C for the measurement. The ambient temperature was set to 25° C. The capacity retention rate was calculated from an equation: $(X_n/X_{0.25})\times 100$, where $X_{0.25}$ represents the measured discharged capacity at 0.25 C, and $X_n$ represents the measured value in the range of 0.5 C to 30 C. The term 1 C here means the current value for full charging in one hour. In the present evaluation, 0.48 mA is equivalent to 1 C. The higher the capacity retention rate is, the better the rate characteristics is. The results are described in FIG. 2. It proves that the electric storage device (Sample A) of the present invention has more excellent rate characteristics, compared to the electric storage device (Sample B) in the comparative example.

INDUSTRIAL APPLICABILITY

According to the method for producing lithium titanate of the present invention, a target lithium titanate can be reliably and stably produced at a heating temperature lower than that in a conventional method at a low cost.

The use of the lithium titanate produced by the method as an electrode active material allows for production of an electric storage device excellent in battery characteristics, in particular, rate characteristics.

The invention claimed is:

1. A method for producing a target lithium titanate $Li_4Ti_5O_{12}$ comprising heating materials consisting essentially of the following three materials under an oxidizing atmosphere:
   (1) a titanium compound which is selected from the group consisting of metatitanic acid, orthotitanic acid, and titanium oxide;
   (2) a lithium compound having a volume average particle diameter of 5 μm or less measured by a laser diffraction method, wherein the lithium compound is selected from the group consisting of lithium hydroxide, lithium carbonate, lithium nitrate, lithium sulfate, and lithium oxide; and
   (3) a lithium titanate compound having a same crystal structure as that of a target lithium titanate, wherein the materials (1), (2), and (3) are dry-mixed prior to heating.

2. The method for producing the target lithium titanate according to claim 1, wherein the lithium compound is crushed to have a volume average particle diameter of 5 μm or less.

3. The method for producing the target lithium titanate according to claim 1, wherein the titanium compound has a volume average particle diameter of 0.5 to 5 μm measured by the laser diffraction method.

4. The method for producing the target lithium titanate according to claim 1, wherein a ratio (B/A) of the volume average particle diameter (B μm) of the lithium compound to the volume average particle diameter (A μm) of the titanium compound is 0.1 to 8.

5. The method for producing the target lithium titanate according to claim 1, wherein the lithium titanate has a single-phase rate represented by the following expression 1, of 95% or more:

$$\text{Single-phase rate (\%)} = 100\times(1-\Sigma_i(Y_i/X)) \qquad \text{(Expression 1)}$$

where X represents a main peak intensity of the target lithium titanate and $Y_i$ represents a main peak intensity of each sub-phase having a different composition from the target lithium titanate, respectively in a powder X-ray diffraction measurement by a Cu-Kα ray.

6. The method for producing the target lithium titanate according to claim 1, wherein the heating temperature is 700° C. to 800° C.

7. The method for producing the target lithium titanate according to claim 1, wherein the dry-mixing is performed with a dry-crushing machine.

8. The method for producing the target lithium titanate according to claim 7, wherein the dry-crushing machine is an air flow crusher.

9. The method for producing the target lithium titanate according to claim 1, wherein the lithium compound is lithium carbonate.

* * * * *